(12) United States Patent
Jose

(10) Patent No.: US 11,416,917 B2
(45) Date of Patent: Aug. 16, 2022

(54) CONTENT CAROUSEL

(71) Applicant: ContextLogic Inc., San Francisco, CA (US)

(72) Inventor: Mary Jose, San Jose, CA (US)

(73) Assignee: CONTEXTLOGIC, INC., San Francisco, CA (US)

( * ) Notice: Subject to any disclaimer, the term of this patent is extended or adjusted under 35 U.S.C. 154(b) by 0 days.

(21) Appl. No.: 16/984,398

(22) Filed: Aug. 4, 2020

(65) Prior Publication Data
US 2022/0044309 A1 Feb. 10, 2022

(51) Int. Cl.
*G06F 3/0482* (2013.01)
*G06Q 30/06* (2012.01)
*G06F 3/04817* (2022.01)

(52) U.S. Cl.
CPC ....... *G06Q 30/0643* (2013.01); *G06F 3/0482* (2013.01); *G06F 3/04817* (2013.01); *G06Q 30/0621* (2013.01)

(58) Field of Classification Search
CPC .......... G06Q 30/0643; G06Q 30/0621; G06Q 30/00; G06F 3/04817; G06F 3/0482; G06F 3/0481; G06F 16/954; G06F 3/0485; G06F 3/0484; G06F 3/0488; G06F 3/04883
See application file for complete search history.

(56) References Cited

U.S. PATENT DOCUMENTS

| | | | | |
|---|---|---|---|---|
| 6,335,737 B1 * | 1/2002 | Grossman | .......... | H04N 21/4438 715/719 |
| 6,396,500 B1 * | 5/2002 | Qureshi | .................. | G06T 11/00 345/473 |
| 8,028,250 B2 * | 9/2011 | Vronay | ................. | G06F 3/0482 715/853 |
| 8,621,359 B2 * | 12/2013 | Cao | ........................ | G06T 11/206 715/734 |
| 9,047,824 B2 * | 6/2015 | Jain | ........................ | G06F 3/0485 |

(Continued)

FOREIGN PATENT DOCUMENTS

CN 111427574 A * 7/2020
EP 1929778 A1 * 6/2008 ......... H04N 5/44504

(Continued)

OTHER PUBLICATIONS

Cool Javascript Slideshow with Crossfade, Feb. 5, 2018, retrieved from—https://web.archive.org/web/20180204120512/https://www.seabreezecomputers.com/slideshow/, 19 pages (Year: 2018).*

(Continued)

*Primary Examiner* — Yongjia Pan
(74) *Attorney, Agent, or Firm* — Schwegman Lundberg & Woessner, P.A.

(57) ABSTRACT

Described herein are techniques for presenting a graphical user interface with an improved content carousel for presenting a set of content items (e.g., images, photos, video clips, content/page links) in accordance with configuration settings set by an end-user. The content carousel may, for example, select content and present content in a manner that is consistent with the configuration settings established by the end-user, thereby giving the end-user confidence to invoke the content carousel in a variety of scenarios where content carousels might not traditionally be deployed.

10 Claims, 15 Drawing Sheets

(56) References Cited

U.S. PATENT DOCUMENTS

| | | | | |
|---|---|---|---|---|
| 9,262,036 | B2* | 2/2016 | Nurse | G06F 3/048 |
| 9,753,609 | B2* | 9/2017 | Tseng | G06F 3/0482 |
| 10,901,607 | B2* | 1/2021 | Banguero | G06F 3/0483 |
| 2005/0229102 | A1* | 10/2005 | Watson | G06F 3/0481 |
| | | | | 715/739 |
| 2005/0234782 | A1* | 10/2005 | Schackne | G06Q 30/0601 |
| | | | | 705/26.1 |
| 2008/0111829 | A1* | 5/2008 | Reid | G06F 16/54 |
| | | | | 345/611 |
| 2008/0317386 | A1* | 12/2008 | Wood | G06F 16/54 |
| | | | | 382/307 |
| 2011/0126155 | A1* | 5/2011 | Krishnaraj | G06T 13/80 |
| | | | | 715/811 |
| 2013/0208000 | A1* | 8/2013 | Uysal | G09G 5/34 |
| | | | | 345/629 |
| 2013/0339198 | A1* | 12/2013 | Gray | G06Q 30/0601 |
| | | | | 705/27.2 |
| 2014/0258049 | A1* | 9/2014 | Gonsalves | G06Q 30/0643 |
| | | | | 705/27.2 |
| 2014/0337321 | A1* | 11/2014 | Coyote | G06F 3/0482 |
| | | | | 707/722 |
| 2016/0291846 | A1* | 10/2016 | DeWeese | G06F 3/04815 |
| 2017/0091154 | A1* | 3/2017 | Eppolito | G06T 11/60 |
| 2017/0357382 | A1* | 12/2017 | Miura | G06F 3/04817 |
| 2018/0307402 | A1* | 10/2018 | Hall | G06F 3/04845 |
| 2020/0226179 | A1* | 7/2020 | Novikoff | G06F 16/58 |
| 2020/0402147 | A1* | 12/2020 | Lin | G06F 3/0484 |

FOREIGN PATENT DOCUMENTS

| | | | | |
|---|---|---|---|---|
| RU | 2740220 C2 * | 1/2021 | | G06F 3/0482 |
| WO | WO2001078304 A1 * | 10/2001 | | |
| WO | WO-2010046147 A1 * | 4/2010 | | G06F 3/0488 |

OTHER PUBLICATIONS

Play speed of embedded video in Powerpoint, Jun. 7, 2011, retrieved from—https://www.rdpslides.com/pptfaq/FAQ00712_Playing_movies_in_slow_or_fast_motion.htm, 1 page (Year: 2011).*

Auto carousel View, Nov. 7, 2018, retrieved from—https://social.msdn.microsoft.com/Forums/en-US/2c5f7240-bf33-44cc-9cee-f24d74bf3f5e/auto-carousel-view?forum=xamarinforms, 5 pages (Year: 2018).*

How can I control the speed that bootstrap carousel slides in items?, Jun. 27, 2013, retrieved from—https://stackoverflow.com/questions/17332431/how-can-i-control-the-speed-that-bootstrap-carousel-slides-in-items, 11 pages (Year: 2013).*

Glider.js, Nov. 10, 2018, retrieved from—https://web.archive.org/web/20181110223403/https://nickpiscitelli.github.io/Glider.js/, 21 pages (Year: 2018).*

Fetch videos with duration less than 10 seconds, Jul. 3, 2017, retrieved from—https://stackoverflow.com/questions/44878949/fetch-videos-with-duration-less-than-10-seconds, 1 page (Year: 2017).*

Carousel View Auto Sliding in Xamarin Forms, Jul. 8, 2017, retrieved from—https://stackoverflow.com/questions/44984828/carousel-view-auto-sliding-in-xamarin-forms, 3 pages (Year: 2017).*

Carousel, Oct. 1, 2018, retrieved from—https://web.archive.org/web/20181001101230/https://getbootstrap.com/docs/4.0/components/carousel/, 6 pages (Year: 2018).*

Photo slide-shows on Linux: Imagination, Aug. 29, 2012, retrieved from—https://massimomusante.blogspot.com/2012/08/photo-slide-shows-on-linux-imagination.html, 2 pages (Year: 2012).*

Working With Nop JCarousel, Mar. 22, 2014, retrieved from—https://web.archive.org/web/20140322020531/https://www.nop-templates.com/Help/NopJCarousel/Version_3_2/lessons/Working_With_Nop_JCarousel.html, 4 pages (Year: 2014).*

* cited by examiner

CONTENT CAROUSEL

TECHNICAL FIELD

The present application generally relates to improvements to data processing and user interfaces in the realm of online, mobile, and computer-based applications. More specifically, the present application describes an improved, end-user configurable content carousel for presenting content (e.g., images, photos, video clips, content/page links) efficiently in a variety of scenarios, thereby allowing a viewer to passively view related and relevant content with minimal interactions.

BACKGROUND

End-users of online or network-based applications are presented with a seemingly endless amount of media content—for example, graphic images, photographs, videos, and links to the same. Mobile computing devices, such as mobile phones, are commonly equipped with image sensors making it easier than ever to capture and share photos and videos. Accordingly, end-users of messaging, email, e-commerce and social networking services are receiving vast amounts of content via chat or messaging applications, social feeds, e-commerce or shopping sites, photo/video sharing services and a wide variety of other online services. By way of example, many e-commerce sites present product listings with numerous (e.g., ten or more) photos of even the most mundane products. When such products are available in different colors, sizes, gender and/or age variants, styles, or other configurations, the number of photos presented can increase significantly, particularly when many or all variants of the product are shown in individual photos. In many instances, along with the numerous photos, product listings will include one or more videos showing a product in use, or a product review.

Given the vast amount of content that is presented to the typical end-user of an online or network-based application, the end-user will ultimately spend a significant amount of time and effort interacting with and navigating a user interface (e.g., clicking, touching, swiping, etc.) to access all of the content. When such content is accessed via a mobile computing device, such as a mobile phone with a touchscreen display, the end-user may have a difficult time touching and swiping the elements of the user interface in order to access all of the desired content. Furthermore, typical mobile phones have some sort of mobile notification feature implemented as part of the mobile operating system to notify the end-user that new content has been published and is available via various mobile applications. In many instances, these mobile notifications provide a link to content that is hosted via a network-accessible server, such that, selecting the link will cause the mobile phone to request a copy of the content item from the server. Accordingly, to work through a series of mobile notifications for a particular application, an end-user may need to navigate a user interface to switch back and forth between a user interface that is part of the mobile operating system, and one or more applications that retrieve content from a server and then present the content to the end-user. Accordingly, the end-user may spend significant time with his or her head down, navigating various user interfaces to retrieve and view content.

BRIEF DESCRIPTION OF THE DRAWINGS

Embodiments of the present invention are illustrated by way of example and not limitation in the figures of the accompanying drawings, in which.

DETAILED DESCRIPTION

Figure 1:
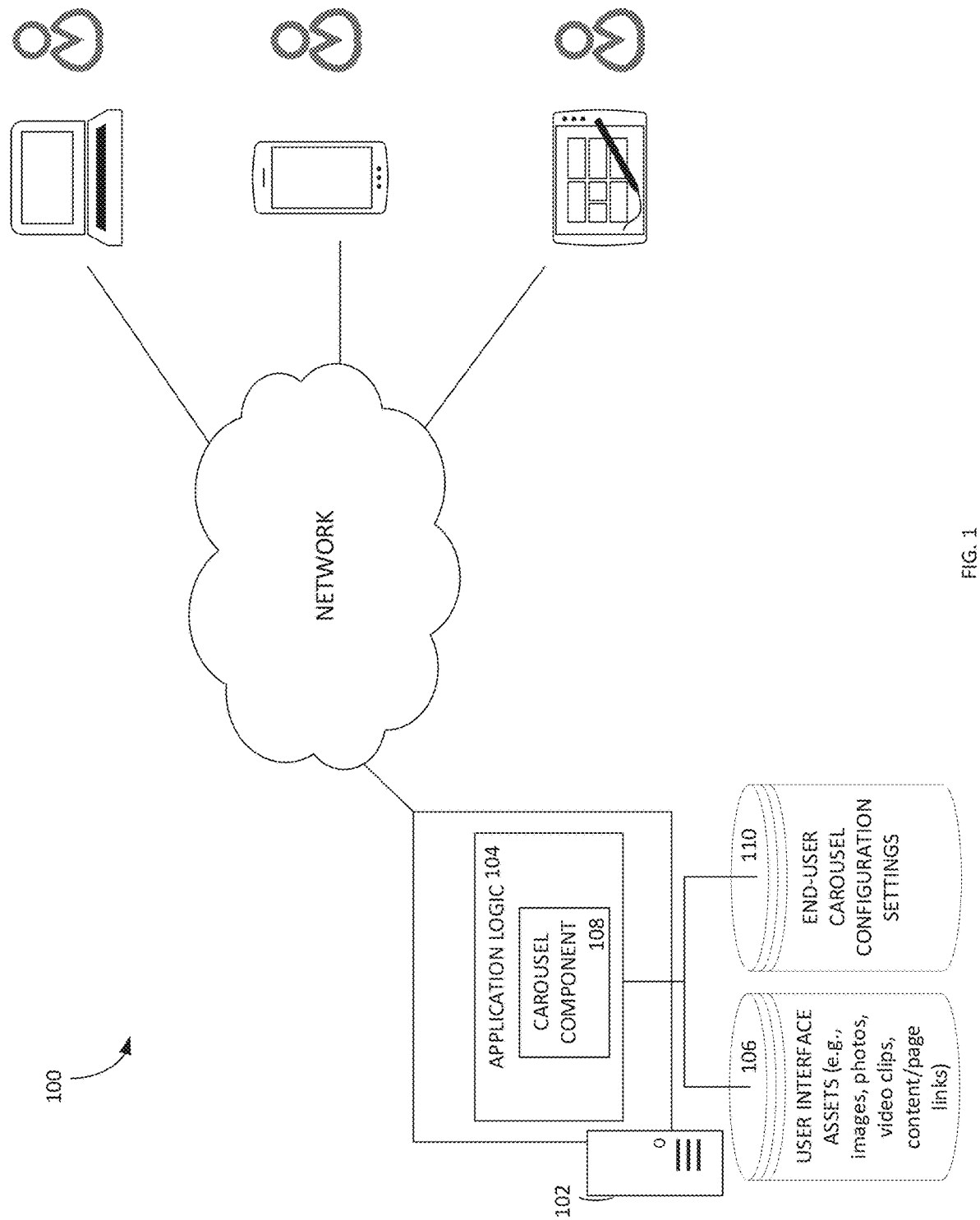
FIG. 1 is a system diagram showing an example of the various components in a network-based computer environment, in which some embodiments of the present invention might be implemented.

Described herein are methods and systems for presenting an improved user interface for displaying content for online or web-based applications, and specifically an improved content carousel. In the following description, for purposes of explanation, numerous specific details and features are set forth in order to provide a thorough understanding of the various aspects of different embodiments of the present invention. It will be evident, however, to one skilled in the art, that the present invention may be practiced with varying combinations of the many details and features.

A content carousel, sometimes referred to as a photo carousel or content slider, is a user interface mechanism sometimes used in online or web-based applications that provides for the presentation of multiple items of content (e.g., images, photos, video clips, content/page links) in a sequence, one after another, much like a slideshow presentation. A conventional content carousel will typically present a sequence of content items such that each content item is presented for some set amount of time before the next content item is presented. Traditionally, content carousels are entirely static in nature as if they have been hard-coded to present the exact same content to every end-user, in the exact same manner (e.g., with the same presentation interval, and so forth). Generally, the behavior of the content carousel is entirely controlled by the software developer that designs and implements the content carousel. In some instances, content carousels may be configured to automatically begin presenting content as soon as the user interface in which the content carousel is included is presented to the end-user. For an end-user not expecting, or worse, not wanting, to view content in a content carousel, automatically invoking the content carousel can be a significant distraction and annoyance, particularly when it is presented in a pop-up window or otherwise overlaying content that the end-user desires to view.

Consistent with embodiments of the present invention, a user interface that includes or is otherwise generally associated with content items that might be presented in a content carousel includes a graphical user interface (GUI) control element (e.g., a button) that allows the end-user to optionally select to invoke a content carousel. As the content carousel includes configuration settings that can be defined by the end-user, at an account level, the end-user can be confident that the content carousel, if invoked, will select and present content in a manner that is preferred by the end-user. Accordingly, by both making the content carousel optional, such that it can be invoked when desired, and providing configuration settings to the end-user that control the operation of the content carousel, the improved content carousel can be made available to end-users in a number of settings where content carousels have typically not been used.

As will be described in greater detail below, consistent with various embodiments of the invention, an improved content carousel may be deployed in a wide variety of settings with a wide variety of applications. In each instance, the content carousel will be associated with a set of configuration settings, which are accessible to each individual end-user such that the configuration settings can be defined by each end-user at an account level. This means that for a particular online application or service, the end-user can establish configuration settings that will be effective across the entire application or service. The specific configuration settings that are available to an end-user will generally depend upon and vary from one application to the next. However, generally, the configuration settings will include specific settings that allow the end-user to establish and control content selection parameters, and content presentation parameters. For instance, some configuration settings will provide content selection parameters that will establish conditions that must be satisfied in order for a particular content item to be selected for presentation via a content carousel in a particular context. Other configuration settings will include content presentation parameters that influence the manner in which selected content is presented via the content carousel. Other aspects of the present invention will be readily ascertainable from the description of the figures that follows.

FIG. 1 is a system diagram showing an example of the various components in a network-based computer environment, in which some embodiments of the present invention might be implemented. As shown in FIG. 1, the computer environment 100 includes an application server 102, or group of servers, executing application logic 104—e.g., an online or web-based application, such as an e-commerce website, or a social networking service, a messaging or email service or some other similar web-based application or service. The application logic 104 will generally receive requests over a network 106 from various end-user client devices (e.g., desktops, laptops, mobile phones, tablet computers). In response to various requests, the application logic 104 will access data, such as the user interface assets stored in a database 106, and communicate user interfaces to the requesting client devices.

Consistent with some embodiments, some of the user interfaces presented at the client devices may include a user interface element (e.g., a button, or similar UI element selectable by an end-user) that will invoke a content carousel to select and present content items (e.g., images, photos, video clips, content/page links) in a manner that is consistent with one or more configuration settings for the content carousel as established by the end-user. Accordingly, as shown in FIG. 1, a carousel component 108 is integrated with the application logic 104. The carousel component 108 will access configuration settings from database 110 and use those configuration settings when processing a request from a particular end-user.

Consistent with some embodiments of the present invention, various content items may have meta-data embedded or otherwise associated therewith. The meta-data may identify the subject matter of the content item. By way of example, a photo may have meta-data identifying the subject matter depicted within the photo, along with various details. For instance, in the context of an e-commerce website, the photo may be tagged with keywords that identify the particular product, and in some instances, various details that indicate which variant of a particular product is depicted in the photo. Similarly, with some embodiments, the various content items may be stored in a hierarchical file structure that is organized around the subject matter depicted in the photos and videos. By way of example, a directory structure may have a specific hierarchy of directories, such that each directory in the hierarchy stores photos satisfying certain conditions. In this manner, the content selection parameters specified by the configuration settings are able to identify specific attributes associated with certain content items when selecting content items to present via the content carousel.

Figure 2:
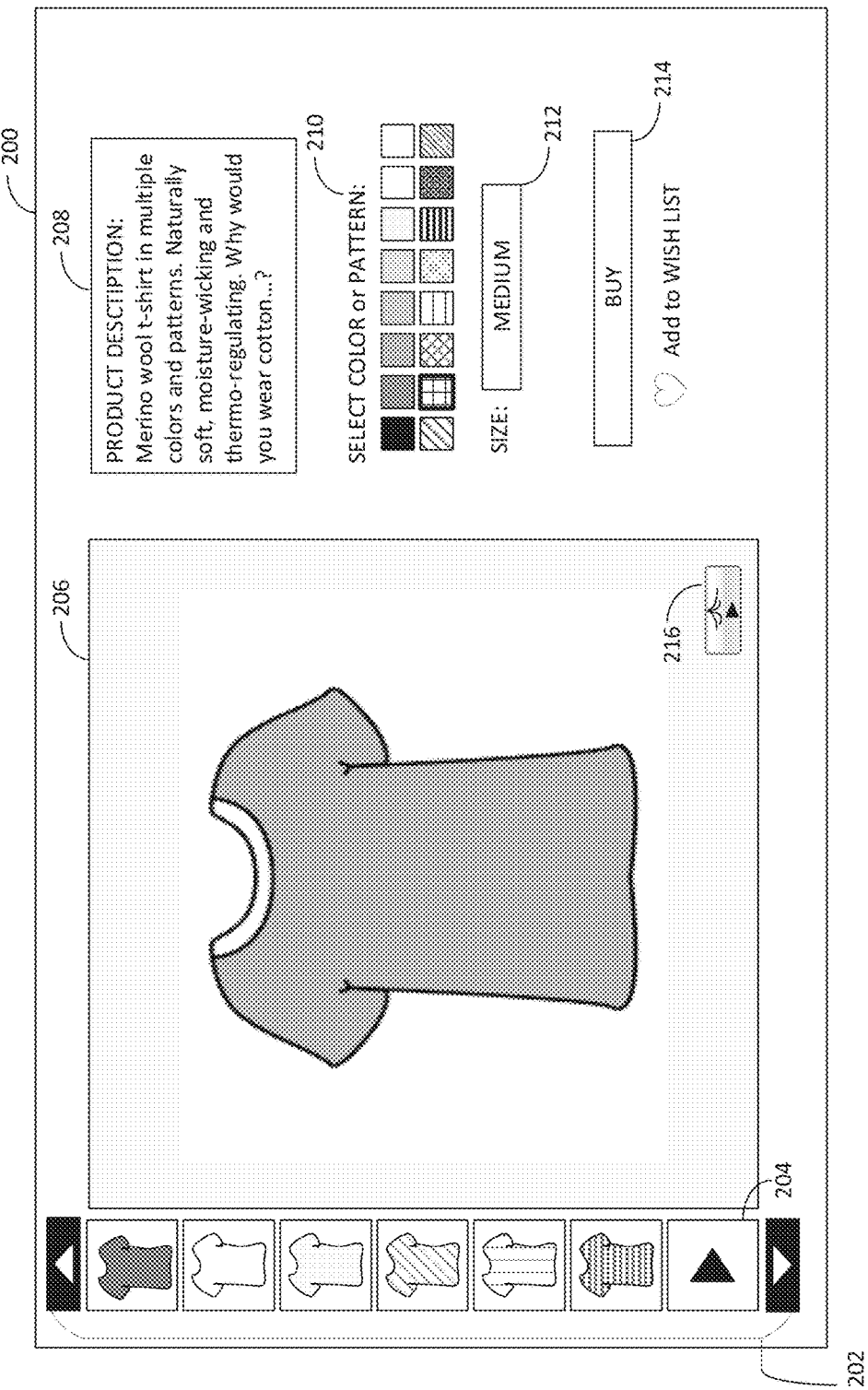
FIGS. 2 and 3 are user interface diagrams showing examples of user interfaces for an e-commerce site with which the improved content carousel is integrated, consistent with embodiments of the present invention.
Figure 3:
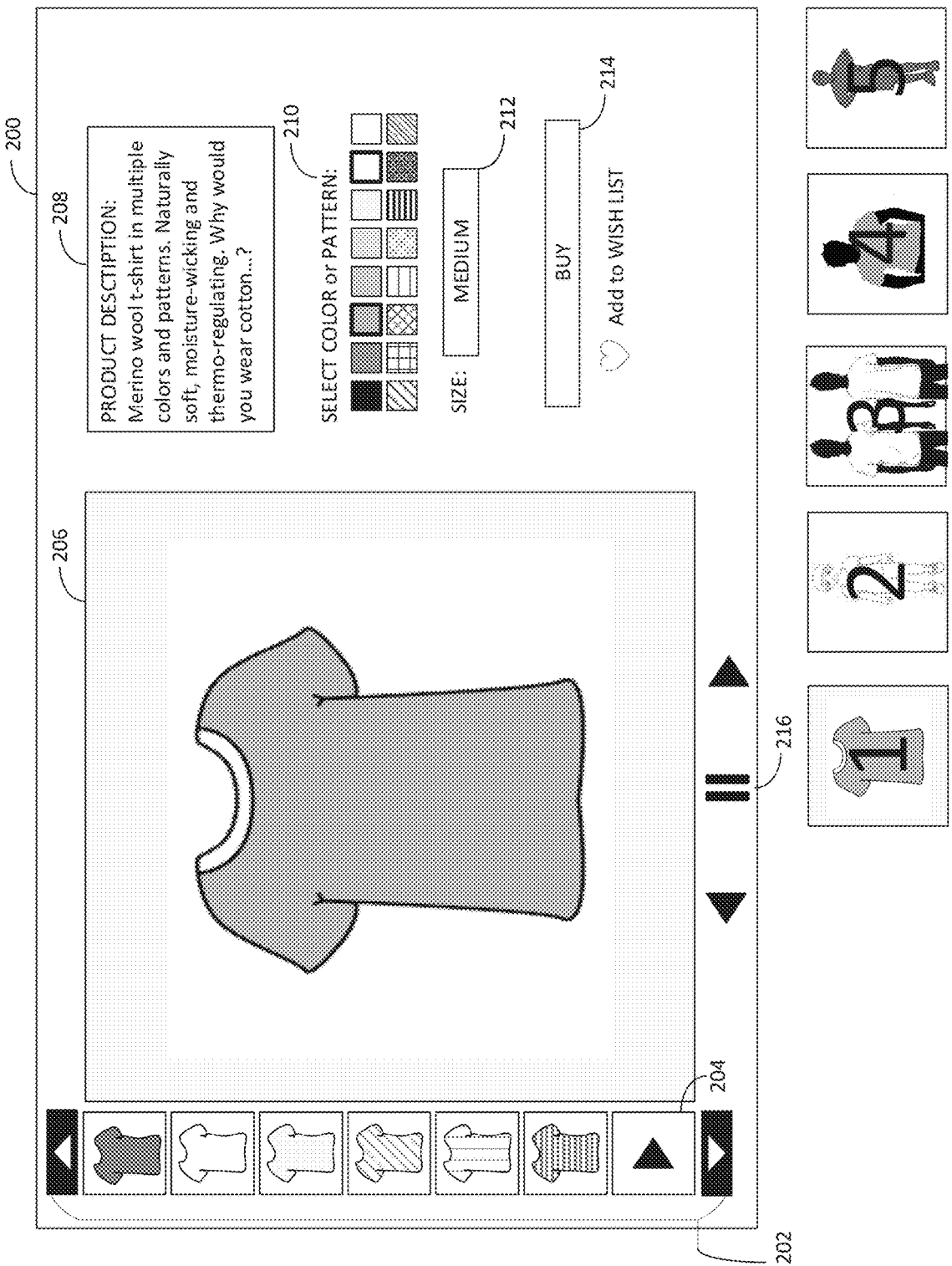

FIGS. 2 and 3 are user interface diagrams showing examples of user interfaces for an e-commerce site with which the improved content carousel is integrated, consistent with embodiments of the present invention. As shown in FIG. 2, the user interface 200 generally depicts a product listing for an e-commerce application or website. Specifically, in this example, the product listing is for a T-shirt that comes in multiple colors and patterns, as well as multiple sizes. Along the left side of the user interface is a scrollable selection of thumbnail images 202 depicting different variants of the T-shirt. For example, the thumbnail images 202 show the T-shirt in various colors and patterns. Additionally, at least one thumbnail image 204 represents a video. Such a video may include a person wearing a particular variant of the T-shirt, or perhaps a person speaking to and demonstrating the quality of the T-shirt. When the end-user selects one of the thumbnail images, the corresponding photo or video is presented in a larger, perhaps higher resolution, format in a primary content window or frame, with reference number 206.

As shown in FIG. 2, on the right side of the user interface, there is a product description 208, and two input control elements (e.g., with reference numbers 210 and 212) that allow the end-user to specify or select a particular color or pattern, and a particular size of T-shirt. Additionally, the user interface includes a button 214 with the label, "BUY," which, when selected, will invoke a process and corresponding user interface flow that will enable the end-user to complete a purchase transaction for a T-shirt.

Consistent with some embodiments of the invention and as shown within the content window or frame 206 in FIG. 2, a graphical user interface element in the form of a button 216 is presented proximate to the content window or frame 206. This button, when selected by the end-user, will invoke the functionality of a content carousel, essentially converting the content window 206 to a content carousel. As illustrated in FIG. 3, the content carousel will select content items that correspond with the thumbnail images on the left side of the user interface, and then present those content items, one after another, in the content window 206, which now operates as a content carousel. As the thumbnail images 202 shown in FIGS. 2 and 3 are only a subset of all the possible thumbnail images that correspond with content items, the selection of content items may of course include content items that are not presented as thumbnail images in the user interface 200. That is, some content items that are above or below those shown (and therefore not included in the user interface) may be selected for presentation via the content carousel. As the selected content items are presented via the content carousel, content carousel playback controls 216 are shown beneath the content carousel 206, enabling the end-user to manually skip forwards or backwards to the next content item, or pause the content carousel to statically show the current content item. As described below in connection with FIG. 4, the selection and presentation of the content items via the content carousel will be subject to a set of configuration settings previously configured by the end-user.

Figure 4:
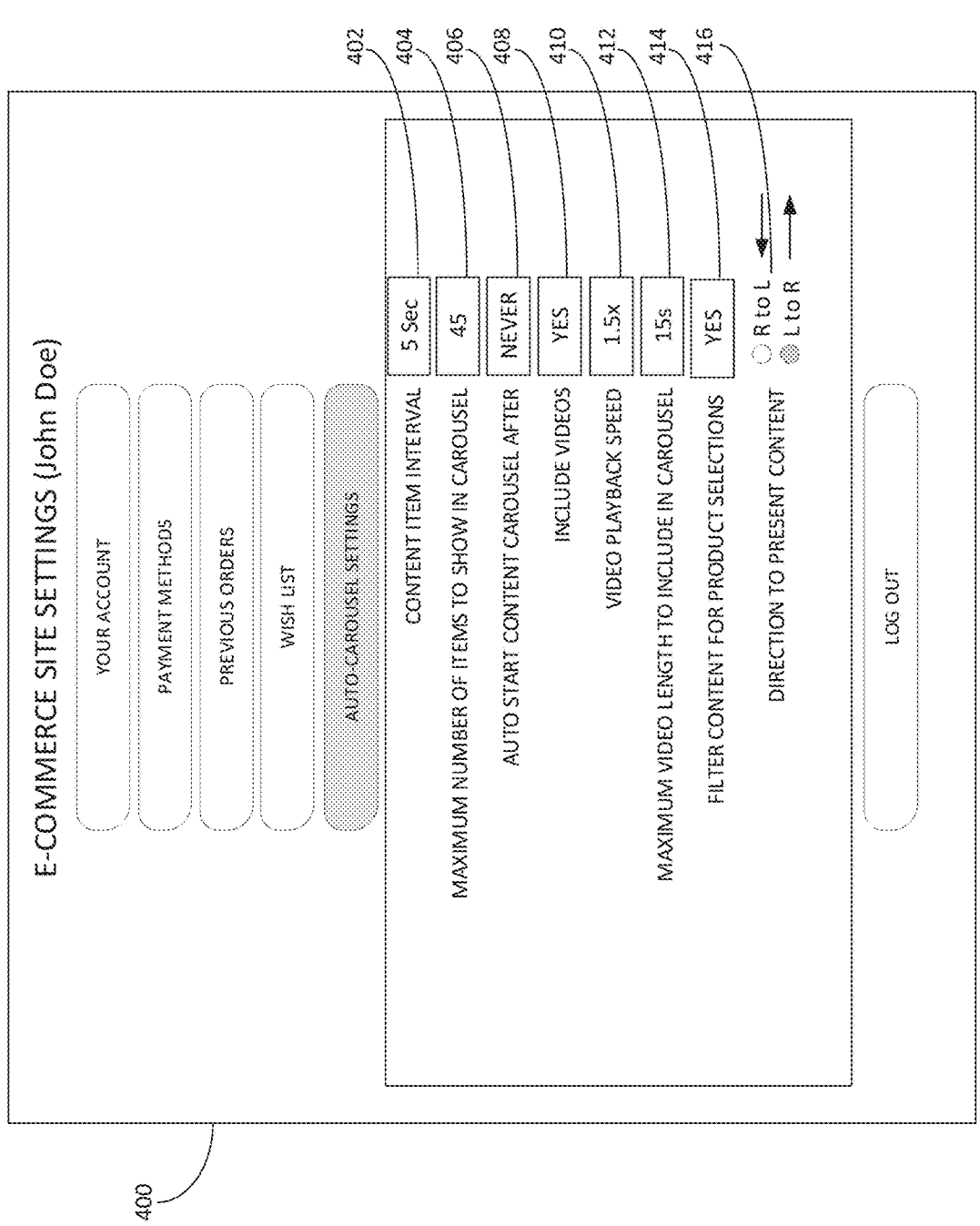
FIG. 4 is a user interface diagram showing an example of a user interface that includes some of the many end-user (e.g., account level) configuration settings for an improved content carousel for use with an e-commerce site, consistent with embodiments of the invention.

FIG. 4 is a user interface diagram showing an example of a user interface 400 that includes some of the many end-user (e.g., account level) configuration settings for an improved content carousel for use with an e-commerce site, consistent with embodiments of the invention. As shown in FIG. 4, consistent with some embodiments, an e-commerce site or service may provide a specific user interface 400 via which the end-user can access and manipulate his or her personal configuration settings for a content carousel that is integrated with the e-commerce site or service. In the example user interface 400 shown in FIG. 4, several configuration settings for the content carousel are shown. A first configuration setting, with reference number 402, provides the end-user with the ability to establish a content item interval. In this context, the content item interval is the amount of time that each content item will be presented by the content carousel before the content item is replaced with the next content item. Accordingly, referring again to FIG. 3, each content item labeled with a number (e.g., 1, 2, 3, etc.) will be presented in the content carousel for a period of time that is determined by the value of the content item interval. This configuration setting is specific to graphic images and photos, and generally does not apply to videos, which will have their own playback length. As the content item interval influences the presentation of content items, the content item interval is an example of a content presentation parameter.

As illustrated in FIG. 4, a second configuration setting 404 is labeled as, "maximum number of items to show in carousel." Consistent with some embodiments, this configuration setting enables the end-user to select some maximum number of content items to be presented via the content carousel. This allows the end-user to limit the number of content items presented by the content carousel when invoked in connection with a product listing, which is particularly useful in some scenarios when there are a significant number of content items satisfying the content selection parameters. With some embodiments, when the total number of content items satisfying all content selection parameters exceeds the maximum number to be presented, the actual content items selected for presentation may be based on some measure of popularity associated with the individual content items. By way of example, if there are one-hundred content items that satisfy the content selection parameters established via the configuration settings, and the end-user has set the configuration setting for the maximum number of content items to be included in the content carousel to forty-five, then only the top forty-five most popular content items will be presented via the content carousel when invoked. The popularity of a content item may be determined in any number of ways. By way of example, with some embodiments, the popularity of any given content item may be measured by the number of times all end-users select (e.g., click-on) a content item in order to view a full resolution (e.g., as opposed to a thumbnail image) version of the image. Alternatively, popularity of a content image may be based on some measure of dwell time, or, some combination of metrics.

Consistent with some embodiments, a configuration setting may provide the end-user with the capability of specifying a time after which the content carousel will automatically begin presenting content items. For instance, as shown in FIG. 4, there is a configuration setting 406 with label, "Auto Start Content Carousel After." By specifying some time in minutes and/or seconds, the end-user can control when the content carousel should automatically begin presenting content items. As shown in FIG. 4, this configuration setting can also be set to "never" or some similar designation so as to prevent the content carousel from ever beginning to present content items automatically—for example, without end-user interaction to invoke the content carousel.

Consistent with some embodiments, a configuration setting, such as that shown in FIG. 4 with reference number 408 and label "Include Videos", may determine whether videos should be included for presentation via the content carousel. For instance, some end-users may prefer to see only photos and/or graphic images, and not videos, presented via the content carousel. In other instances, an end-user may prefer to view videos, but would like the videos played back at a speed that is faster (or slower) than what is the default or normal speed of playback. Accordingly, as illustrated in FIG. 4, a configuration setting with reference number 410 allows the end-user to set a playback speed for videos presented via the content carousel. Another configuration setting with reference number 412 and label "Maximum Video Length to Include in Carousel" allows the end-user to specify a maximum length of video to be selected and presented via the content carousel. As an example, an end-user may not want to see long videos—such as any video that is longer than fifteen seconds. With some embodiments, when determining a video's length, the video playback speed will be taken into consideration. By way of example, if an end-user specifies a playback speed of 1.5×, and a maximum video length of five seconds, a video that would be six seconds long at the default playback speed would be included in the content carousel as its length when played back at a speed of 1.5× would be less than the maximum length specified—that is, five seconds.

Consistent with some embodiments, a configuration setting allows the end-user to specify whether or not content items should be filtered or selected for presentation via the content carousel in accordance with one or more product selections made via the user interface. For instance, if a product listing includes one or more user input control elements for selecting a particular variant of a product, invoking the content carousel when the filter for product selection setting is activated will cause only those content items that match or correspond with the product selections to be presented via the content carousel. By way of example and with reference to FIG. 3, if an end-user is viewing a product listing for a T-shirt, and the end-user has specified, via product selection control elements presented via the user interface (e.g., those with reference numbers 210 and 212), an interest in blue T-shirts in a size "Medium", the content carousel will select only those content items that depict the variant of the product (e.g., the T-shirt) as selected by the end-user. This will advantageously allow the end-user to quickly view the content items depicting the variant of the product that is of most interest to the end-user.

Finally, as illustrated in FIG. 4, one configuration setting may allow the end-user to specify a transition direction for the presentation of content items. For example, with some embodiments, when the content carousel changes from presenting one content item to the next content item, a video transition effect is applied to the content items to give the impression of a directional transition. Accordingly, the end-user may specify a left-to-right, or right-to-left transition. Of course, in other embodiments, the end-user may additionally select a transition that is from top-to-bottom, or from bottom-to-top.

The user interface 400 illustrated in FIG. 4 is just one example, and in various embodiments, these and other configuration settings may be provided. As an example, another configuration setting (not shown) may allow the end-user to select a particular type of transition effect. Another configuration setting may allow the end-user to specify whether the content carousel is to be presented embedded within the existing user interface, for example, as shown in FIG. 3, or alternatively, in a separate pop-up window or user interface. With some embodiments, one or more end-user configuration settings may be derived, based on analysis of an end-user's interactions with a website, generally, and various product listings, specifically. By way of example, an end-user's web-browsing history, search history, and/or purchase history may be analyzed to derive for the end-user one or more configuration settings for the content carousel. Accordingly, if an end-user, through their activities and interactions via a particular online service or website, exhibits personal preferences for specific products or product attributes (e.g., colors, sizes, gender and/or age variants, styles, etc.), the content carousel may automatically establish configuration settings that influence the selection of content for presentation via a content carousel.

Consistent with some embodiments of the present invention, an end-user may establish one or more configuration settings, not only at an account level, such that the configuration settings influence the behavior of a content carousel across the entirety of a particular online service or website, but also at a company or merchant-specific level. For instance, in the context of an e-commerce site or online marketplace, where a variety of products may be offered for sale from different companies or vendors, the end-user may establish a variety of configuration settings that are specific to particular companies or vendors. By way of example, consider a hypothetical company, ACME, which offers for sale via an online e-commerce site a wide variety of products, including furniture, housewares, clothing, shoes, accessories, and many other products. Consistent with some embodiments, company-specific configuration settings may be provided, thereby allowing an end-user to configure the behavior of a content carousel for presenting information about products offered by the particular company. Accordingly, an end-user may set different content item intervals for different companies, such that content presented via a content carousel for one company may be presented for a shorter/longer period of time, before the content carousel switches to the next content item. Similarly, with some embodiments, an end-user may select specific categories of products to be presented via a content carousel, such that, when product information is being presented via a content carousel for products from that particular company, the content carousel will present content relating only to products that are consistent with the categories of products that have been selected, per the configuration settings, by the end-user. In addition to categories, the configuration settings may allow an end-user to specify a variety of other preferred product attributes (e.g., colors, sizes, gender and/or age variants, styles, etc.) on a company-specific level. Accordingly, in a scenario where one person in a family shops for multiple family members, configuration settings for a content carousel can be configured on a company-specific basis, so that content carousels select and present different product information for different companies. If one member of the family prefers products from a particular company, the content carousel for that company can be configured to present content relating to products that are preferred by that member of the family. Similarly, perhaps a person prefers certain styles or sizes of products (e.g., shoes) from one company, but different styles and sizes from another company. By configuring the company-specific content carousel configuration settings appropriately, the end-user will ensure that the content carousels present content that generally corresponds with their preferences, thereby saving the end-user time and effort in finding and viewing preferred products. Accordingly, many of the aforementioned configuration settings for a content carousel may be offered as company-specific configuration settings, allowing the end-user to specify how a content carousel operates on a per-company basis for an e-commerce site, or online marketplace.

Consistent with some embodiments of the invention, for an e-commerce or online marketplace application or service, some portion of the configuration settings for a content carousel may be configurable by the companies, merchants or vendors offering products for sale. Accordingly, the content carousel configuration settings that are configured by a company, merchant or vendor, will influence the operation of the content carousel for all users, when the content carousel is presenting content/information relating to products offered by the particular company, merchant or vendor. By way of example, consistent with some embodiments, configuration settings for a content carousel may allow an authorized agent of a particular company to configure whether product images, and/or videos are to be presented via a content carousel. Similarly, configuration settings may be set to determine whether customer posted images and/or customer posted videos are to be included in a content carousel. Similarly, one or more configuration settings may allow an authorized agent to determine whether images or videos for related product offerings are to be presented. Of course, a great number of other configuration settings and corresponding selection and presentation parameters, whether configured by the end-user or an authorized agent of a company, merchant or vendor, are possible.

Figure 5:
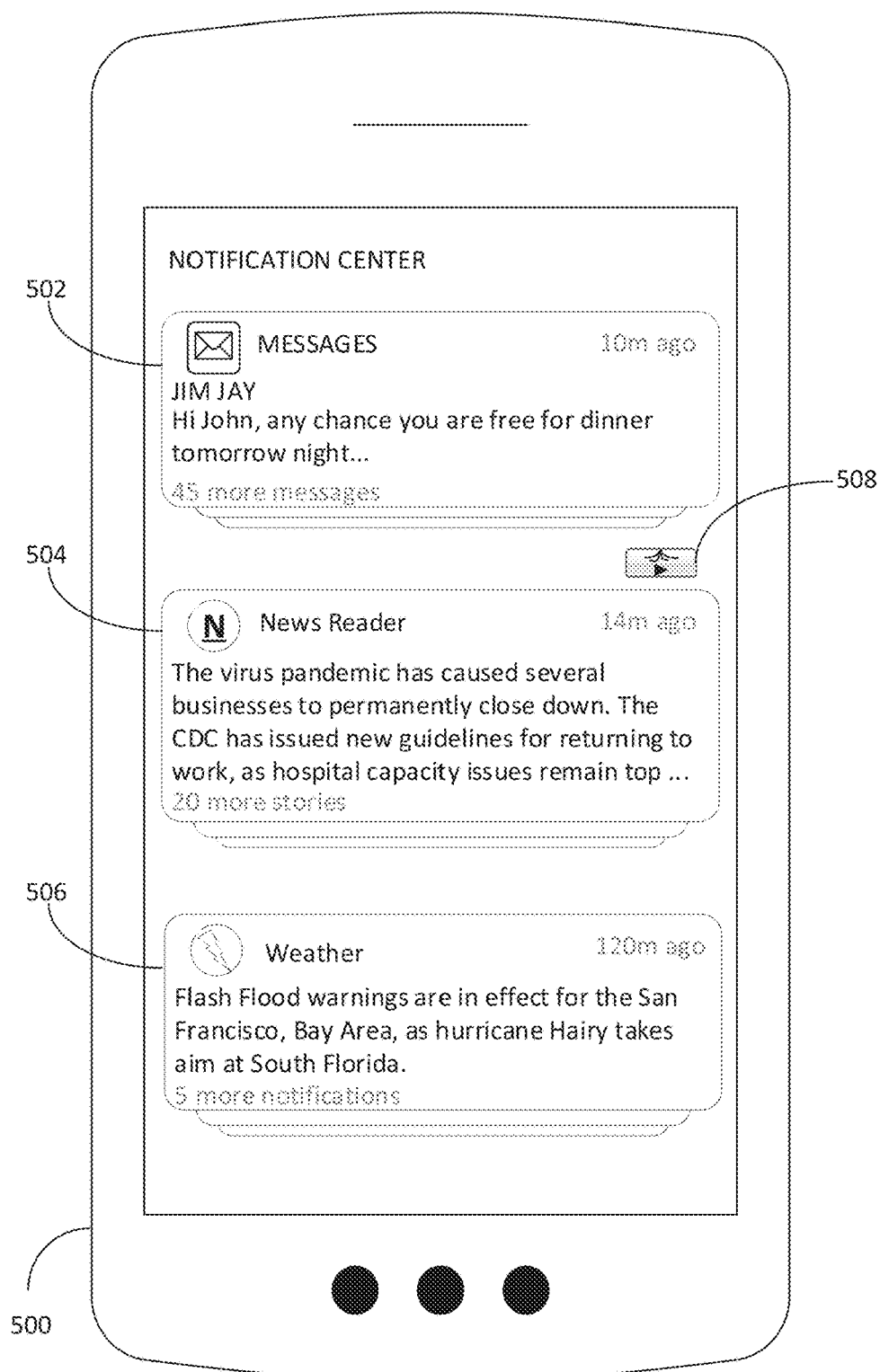
FIGS. 5, 6 and 7 are user interface diagrams illustrating examples of a user interface for a mobile notification application with which the improved content carousel is integrated, consistent with some embodiments of the present invention.
Figure 6:
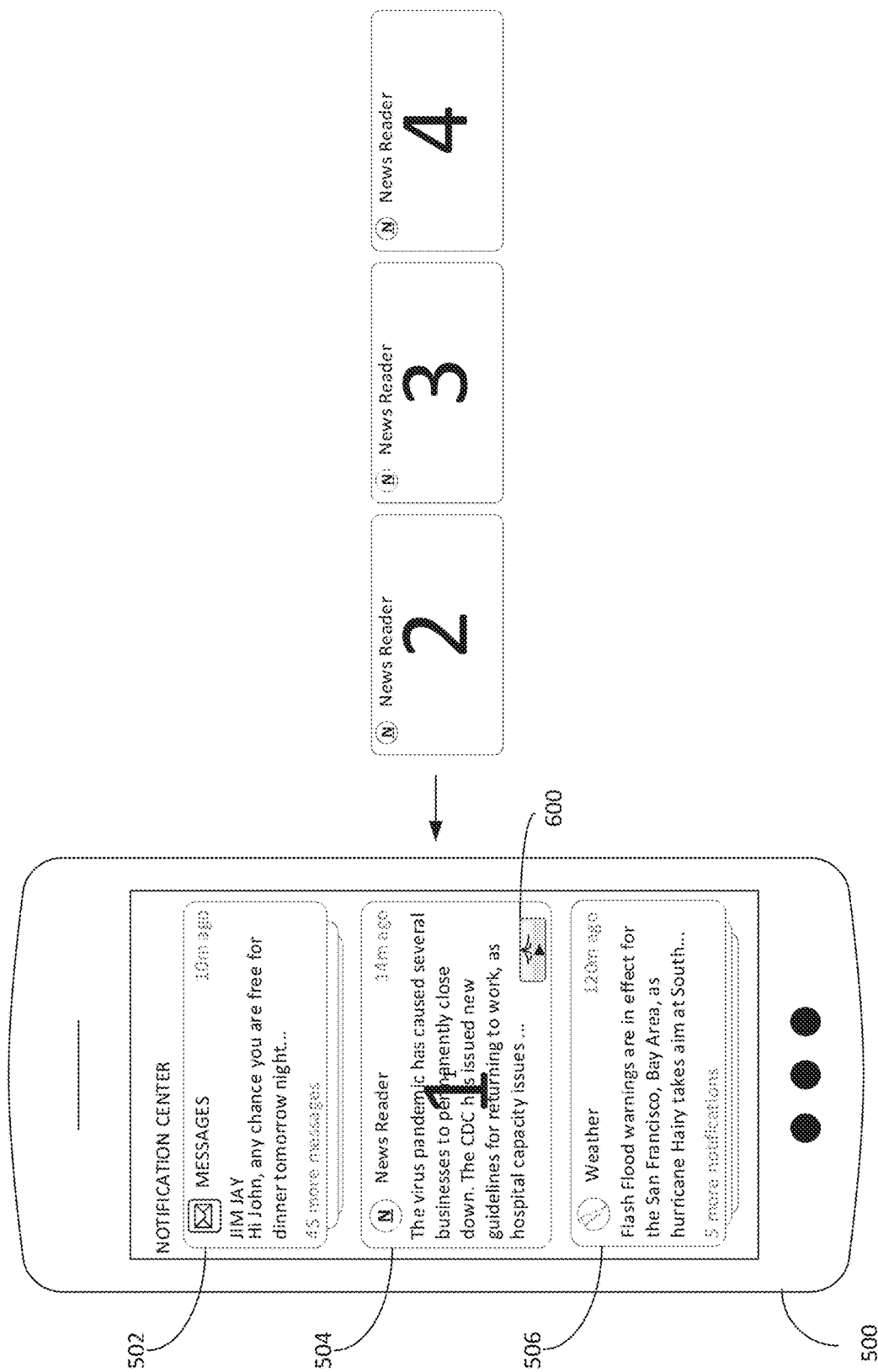
Figure 7:
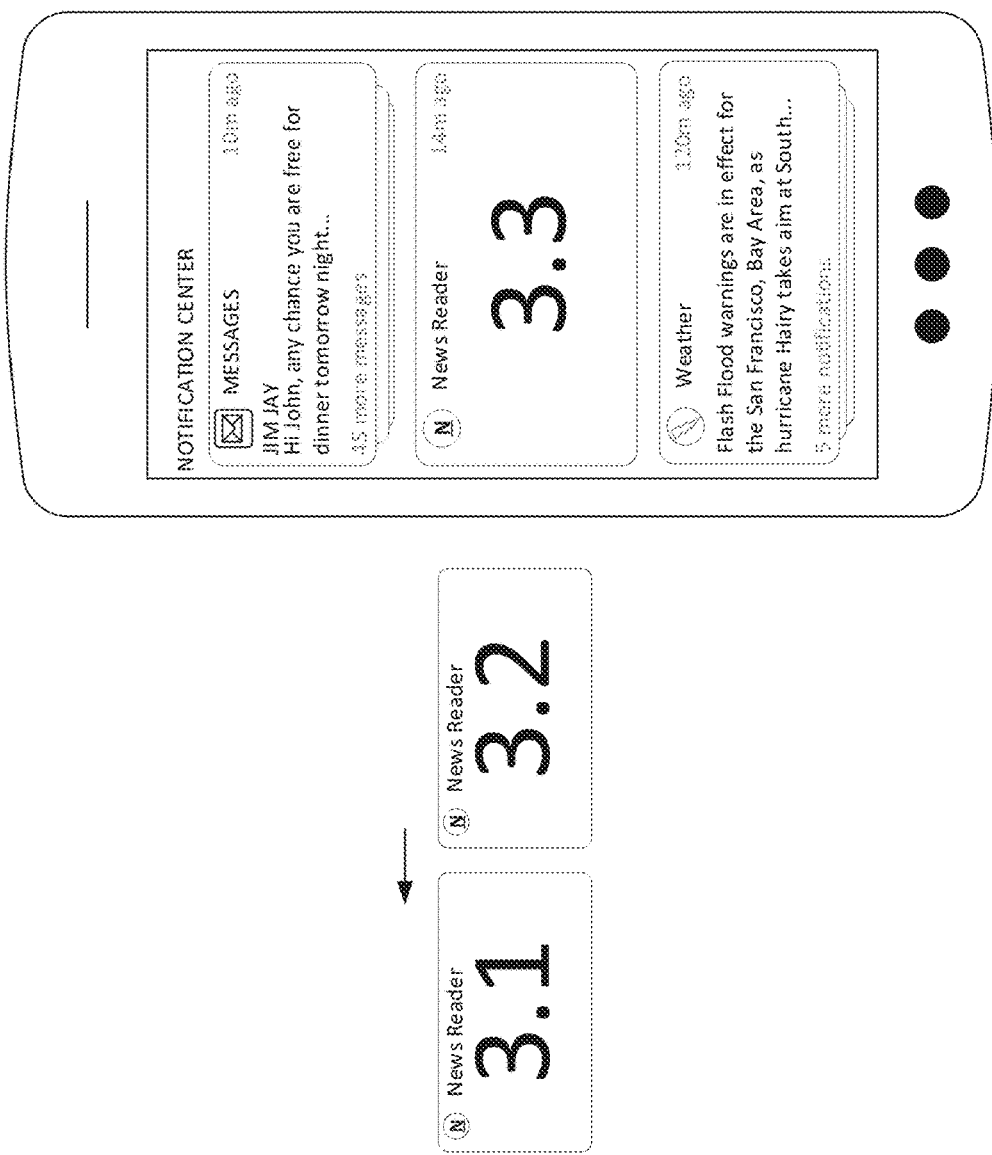

While FIGS. 2, 3 and 4 illustrate user interfaces for using a content carousel with an e-commerce or online marketplace application or website, a content carousel consistent with some embodiments of the invention might also be integrated with and used in the context of a notification system for a mobile operating system. FIGS. 5, 6 and 7 are user interface diagrams illustrating examples of a user interface for a mobile notification system with which the improved content carousel is integrated, consistent with some embodiments of the present invention. As illustrated in FIG. 5, a mobile computing device, such as a mobile phone 500 is shown. The touch-screen display of the mobile phone 500 is presenting a user interface for the mobile operating system's notification center. In this case, the user interface for the notification center is showing that push notifications have been received for three different mobile applications—a messaging application ("Messages") with reference number 502, a "News Reader" application with reference number 504, and a "Weather" application with reference number 506. As shown in the user interface in FIG. 5, above the notifications for the News Reader application is a content carousel button with reference number 508. This button 508, when selected by the end-user, will invoke a content carousel to present push notifications associated with the News Reader application in a manner that is consistent with a set of configuration settings that have been configured by the end-user.

FIG. 6 shows an example of what occurs when the end-user selects the button with reference number 508. Specifically, the push notifications that have been received for the News Reader application will be presented one after another, for some duration of time consistent with the content item interval set by the end-user. As shown in FIG. 6, the push notifications with large reference numbers 1, 2, 3 and 4, will be presented, one at a time, in the user interface. This will allow the end-user to view the top-level push notification for each news story. As indicated in FIG. 6, the active news story—that is, the news story being presented within the content carousel—is shown along with a button with reference number 600. When the end-user selects this button, the currently presented news story is presented via the content carousel in a detailed format. Specifically, the entire text and any images, photos or videos that are part of the news story are retrieved and divided into appropriately sized portions for presentation via the content carousel. In this way, the end-user can select a particular news story presented via the content carousel to obtain an entire copy of the news story for consumption via the content carousel.

FIG. 7 illustrates what happens when the end-user selects the button with reference number 600 as shown in FIG. 6. In this example, the end-user has selected the button 600 (as shown in FIG. 6) while the content carousel was presenting the third news story (e.g., push notification). Accordingly, upon selecting the button 600, the content carousel begins presenting the entire news story associated with the third push notification. This is illustrated in FIG. 6, which shows that the content carousel has already presented portions of the news story corresponding with the large reference numbers, 3.1 and 3.2. The content carousel will continue presenting small portions of the news story until the entire news story has been presented. Advantageously, this allows the end-user with the ability to view and consume the entire news story with minimal interaction with the user interface.

The presentation of the push notifications as illustrated in FIGS. 5, 6, and 7 will of course be subject to the content selection and content presentation parameters that are configured via the configuration settings by the end-user. Although not shown, the notification center may have a specific user interface that allows the end-user to establish and set configuration settings for the content carousel that is integrated with the notification system. In addition to a particular configuration setting for the content item interval, which determines the length of time each content item is presented via the content carousel, a variety of other configuration settings may be set by the end-user. As an example, with some embodiments, the end-user may be able to specify that the content carousel option (e.g., button 600) is to be presented only with certain mobile applications, as specified in the configuration settings. Accordingly, when the push notifications are presented for certain applications, only those applications selected by the end-user to include the optional content carousel will have the content carousel button shown in the notification center.

With some embodiments, the configuration settings may be specific to certain mobile applications for which push notifications are presented. By way of example, an end-user may specify via the configuration settings that only push notifications for the News Reader application that are related to certain topics or subject matter are to be selected for presentation via the content carousel. For instance, the end-user may prefer to only see content related to sports, or some other topics or subject matters. Similarly, the end-user may want to explicitly exclude from the content carousel any push notifications for the News Reader application that are related to politics, and so forth. By establishing these preferences via the configuration settings, the end-user is able to customize the operation of the content carousel and ensure that it operates in a manner that will not annoy or disturb the end-user.

Figure 8:
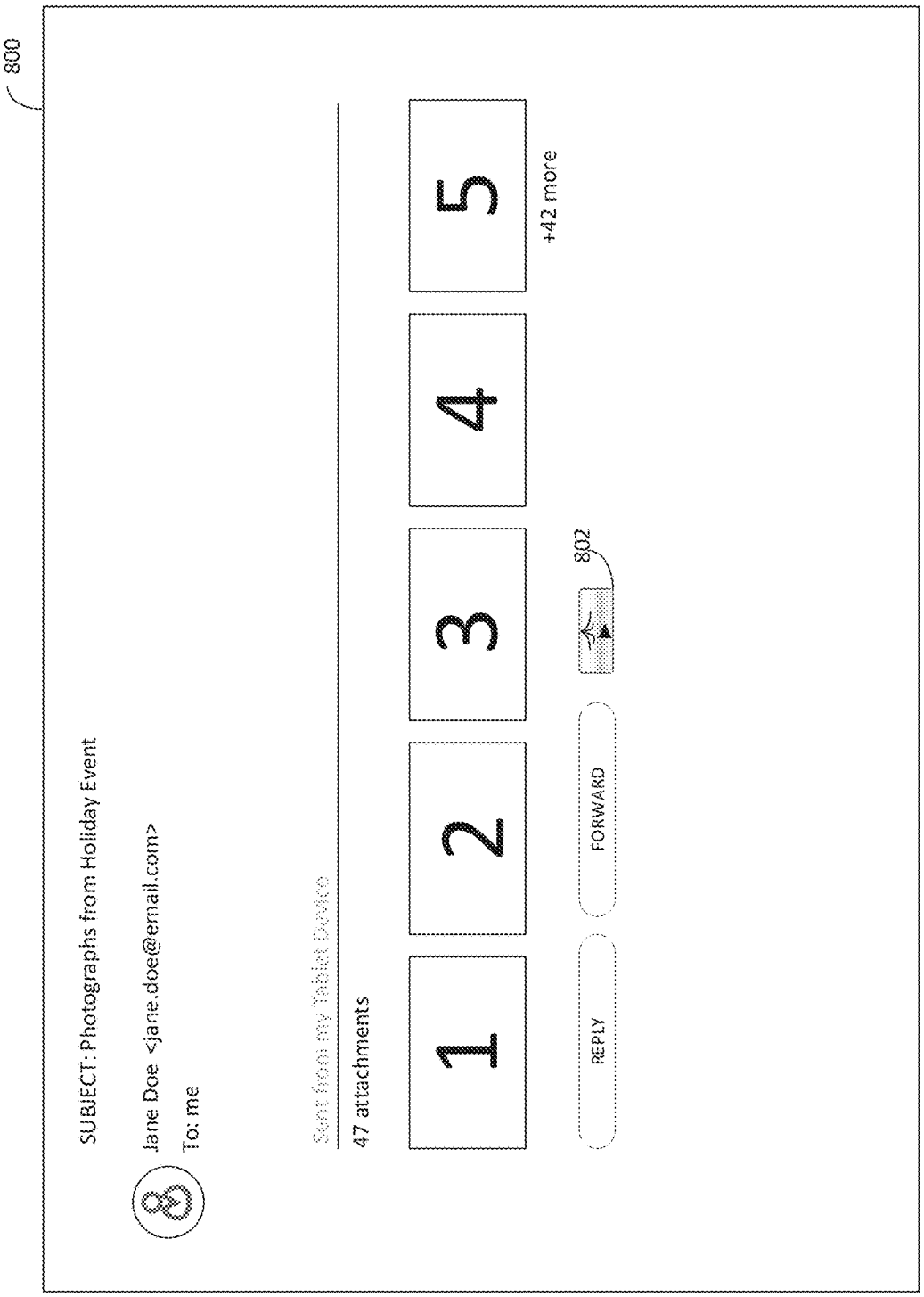
FIGS. 8 and 9 are user interface diagrams illustrating examples of a user interface for an email application with which an improved content carousel is integrated, consistent with some embodiments of the invention.
Figure 9:
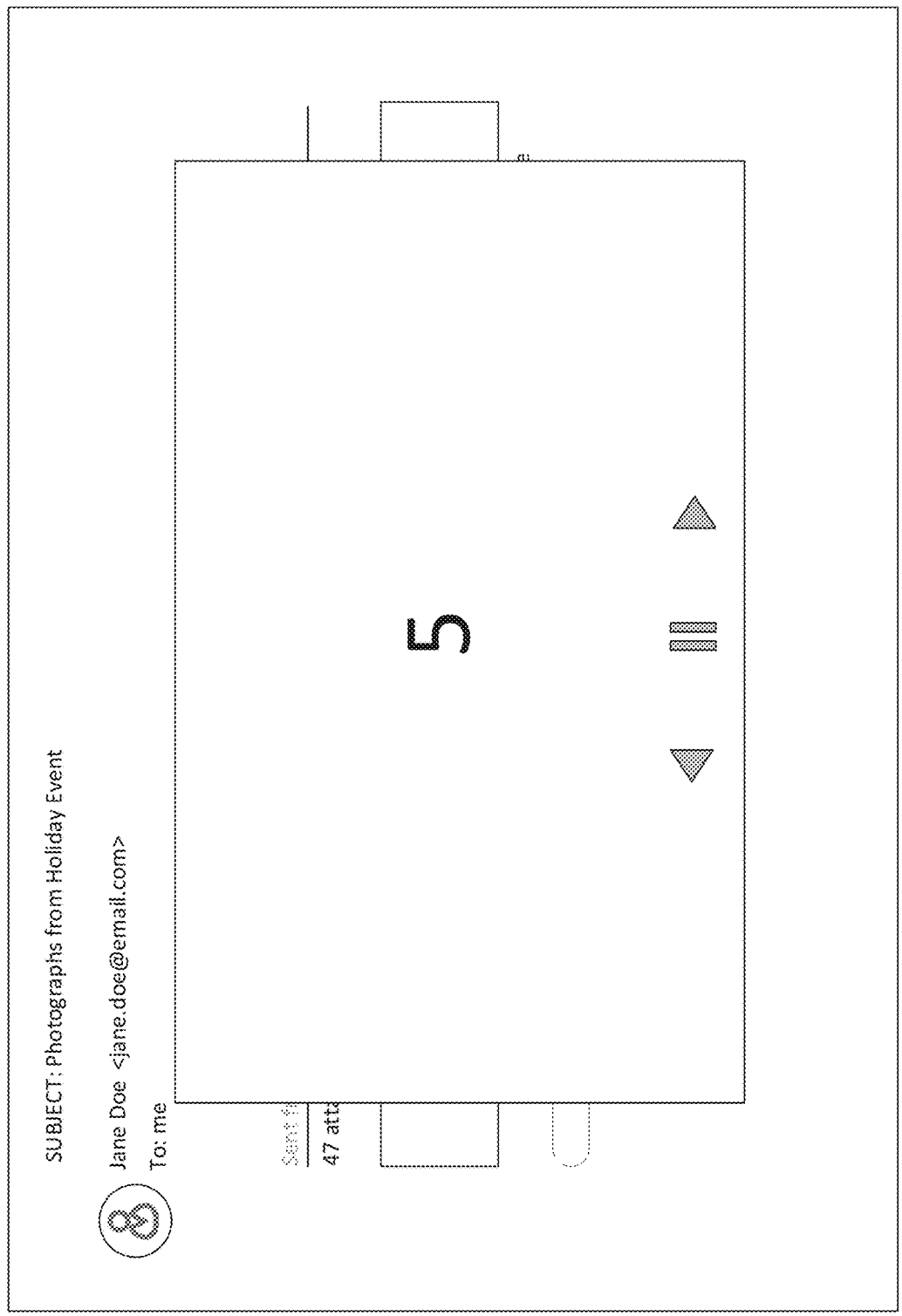

FIGS. 8 and 9 are user interface diagrams illustrating examples of a user interface 800 for an email application with which an improved content carousel is integrated, consistent with some embodiments of the invention. As illustrated in FIG. 8, a user interface 800 is shown for an email client application. In this particular example, the user interface 800 represents an email that has been received by an end-user from a sender by the name, "Jane Doe". In this particular example, the email that has been received by the end-user includes forty-seven attachments that have file formats consistent with photos. Of the forty-seven file attachments, corresponding thumbnail images are shown for the first five. Because the file attachments have file formats consistent with photos, a button 802 is presented, which, if selected by the end-user, will invoke a content carousel to select and present photos in a manner consistent with whatever configuration settings have been configured by the end-user.

With a conventional email client application, if the end-user would desire to see all of the photos, the end-user would likely have to select each and every photo, or at a minimum, interact with some navigation control element to advance from one photo to the next. However, as illustrated in FIG. 8 and consistent with some embodiments of the present invention, the user interface of the email client application includes a button 802 with reference number 802, which, when selected, will invoke a content carousel that will present the photos corresponding with the file attachments in a manner that is consistent with the configuration settings established by the end-user. Accordingly, as shown in FIG. 9, after selecting the button 802, the end-user is presented with a content carousel that presents one photo after another.

In the context of an email client application, the specific configuration settings accessible to the end-user may be similar to those previously described. For instance, with some embodiments, a configuration setting may allow the end-user to establish a content item interval that indicates how long each content item is to be presented via the content carousel. A configuration setting may allow the end-user to determine the particular types of file formats included as file attachments in order for the content carousel button to be presented. A configuration setting may establish the types of content (e.g., images, photos, video clips, content/page links, etc.) to be selected for presentation via the content carousel. With some embodiments, a configuration setting may allow the end-user to specify some number of file attachments included with a received email before the button for the content carousel is presented. In yet another example, with some embodiments, a configuration setting may allow the end-user to specify specific senders from whom emails have been received and for which a content carousel is to be presented. Of course, a wide variety of other configuration settings for the content carousel are possible.

Figure 10:
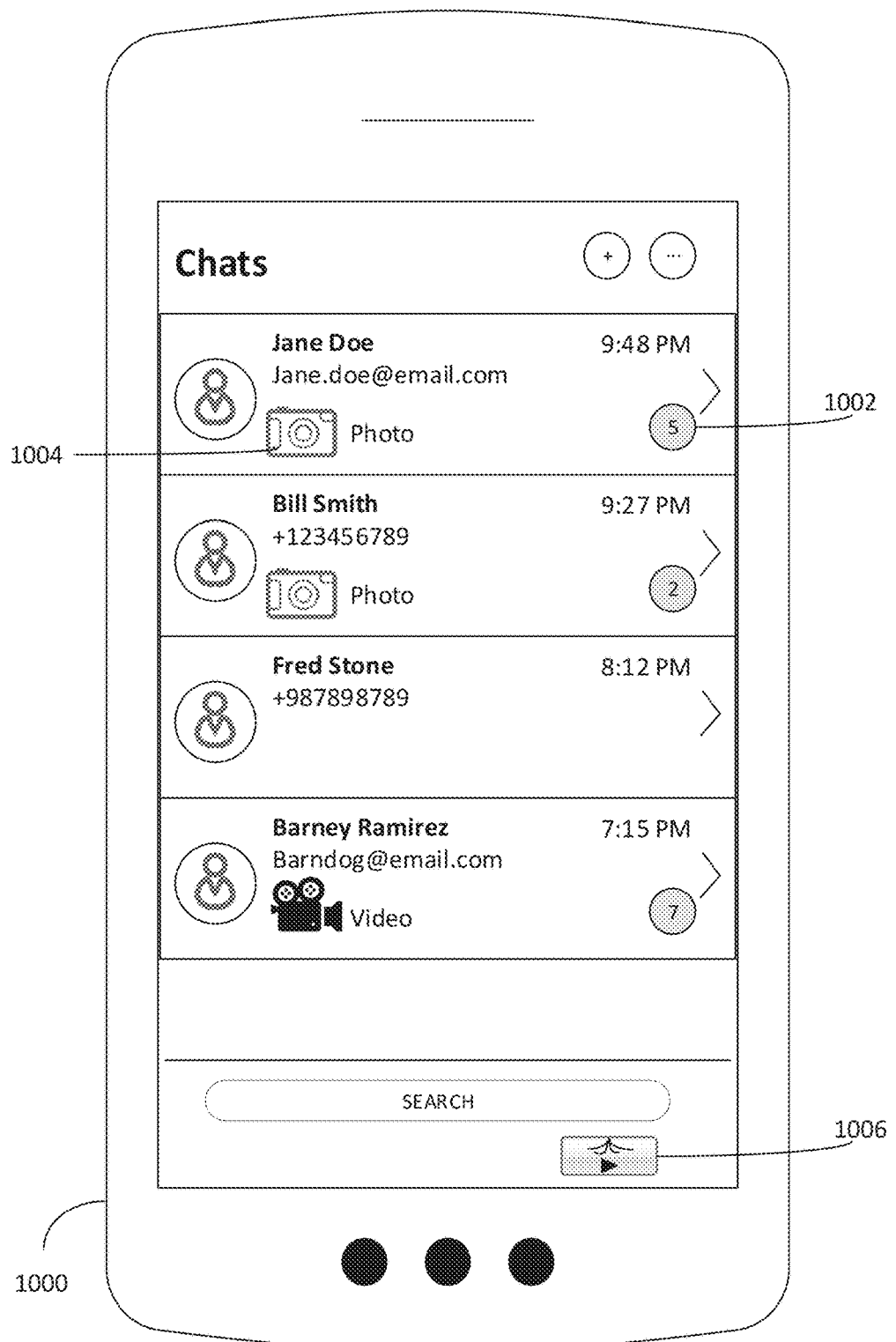
FIG. 10 is a user interface diagram showing an example user interface for a mobile chat or messaging application with which an improved content carousel is integrated, consistent with some embodiments of the present invention.

FIG. 10 is a user interface diagram showing an example user interface for a mobile chat or messaging application, with which an improved content carousel is integrated, consistent with some embodiments of the present invention. As illustrated in FIG. 10, the mobile computing device 1000 is presenting a user interface for the mobile chat application that shows that an end-user has received several new messages, from several senders. Specifically, the user interface in FIG. 10 shows that the end-user has received five new messages from Jane Doe, as indicated by the number five enclosed in a circle with reference number 1002. The icon with reference number 1004 indicates that one or more of the messages received from Jane Doe include files having file formats consistent with photos. Similarly, the end-user has received one or more photos from Bill Smith, and a video file from Barney Ramirez. The button with reference number 1006 is a content carousel button, which, when selected by the end-user will invoke a content carousel to operate in a manner consistent with various configuration settings that have been established by the end-user.

With some embodiments, the end-user may configure one or more configuration settings to specify the particular message senders who should have their sent content items included in a content carousel. By way of example, perhaps the end-user has indicated, via configuration settings, that messages from Jane Doe and Barney Ramirez should be reviewed for content items for presentation via the content carousel, but not messages from Bill Smith. Accordingly, when the end-user selects the button 1006, only those content items from Jane and Barney that otherwise satisfy the content selection parameters will be presented via a content carousel. With some embodiments, the end-user may establish a particular time period during which a content item should have been received in order for it to appear in a content carousel. For example, a configuration setting may indicate that only content items received with messages that arrived in the last twenty-four hours should be selected for presentation via the content carousel, or simply, any new content item that has not yet been viewed. With some embodiments, a content carousel button may be presented next to or near the name of a particular sender, such that, when the button is invoked, only content items received from that sender will appear in the content carousel.

With some embodiments, the content carousel may present messages, in addition to, or instead of, the file attachments of the messages. Accordingly, with some embodiments, selecting the content carousel button may invoke a content carousel to present all new messages, or all new messages from specific senders, where those senders are selected via the configuration settings. This allows the end-user with an option to quickly review all newly received messages in a content carousel with a single selection of the button or similar GUI element that invokes the content carousel. During the presentation of a message via the content carousel, an additional input received from the end-user may serve to interrupt the presentation of messages for any number of reasons, depending upon the context and perhaps the specific portion of the UI that has been selected. For example, when a message being presented via the content carousel includes file attachments representing content items that are photos or videos, selecting some specific portion of the user interface may cause those photos and/or videos to be presented within the content carousel user interface.

Figure 11:
FIG. 11 is a user interface diagram showing an example of a user interface of a feed for a mobile, social networking application having an integrated content carousel, consistent with embodiments of the present invention.

FIG. 11 is a user interface diagram showing an example of a user interface of a feed for a mobile, social networking application having an integrated content carousel, consistent with embodiments of the present invention. In this example, the touch-screen display of the mobile device 1100 shows a particular content item 1102 presented in a social feed of an end-user, and the content item 1102 includes a content carousel button 1104. In this particular instance, the content item in the feed is an advertisement for a T-shirt, with a link to another page or user interface providing additional information about the T-shirt. With some embodiments, selecting the button 1104 will cause presentation of a content carousel that will present various content items associated with the product (e.g., the T-shirt) shown in the social feed. For example, the content carousel may include a variety of additional products being offered for sale by the same company or merchant. With some embodiments, content may be selected for presentation via the content carousel based on company-specific, end-user configuration settings that have been set by the end-user, and/or one or more configuration settings that have been set by an authorized agent of the company or merchant on whose behalf the advertisement is presented. The individual content items will be presented for a duration of time determined by the content item interval, as established by the end-user via the configuration settings for the content carousel. Other configuration settings may also impact the content selection and presentation behavior of the content carousel.

Figure 12:
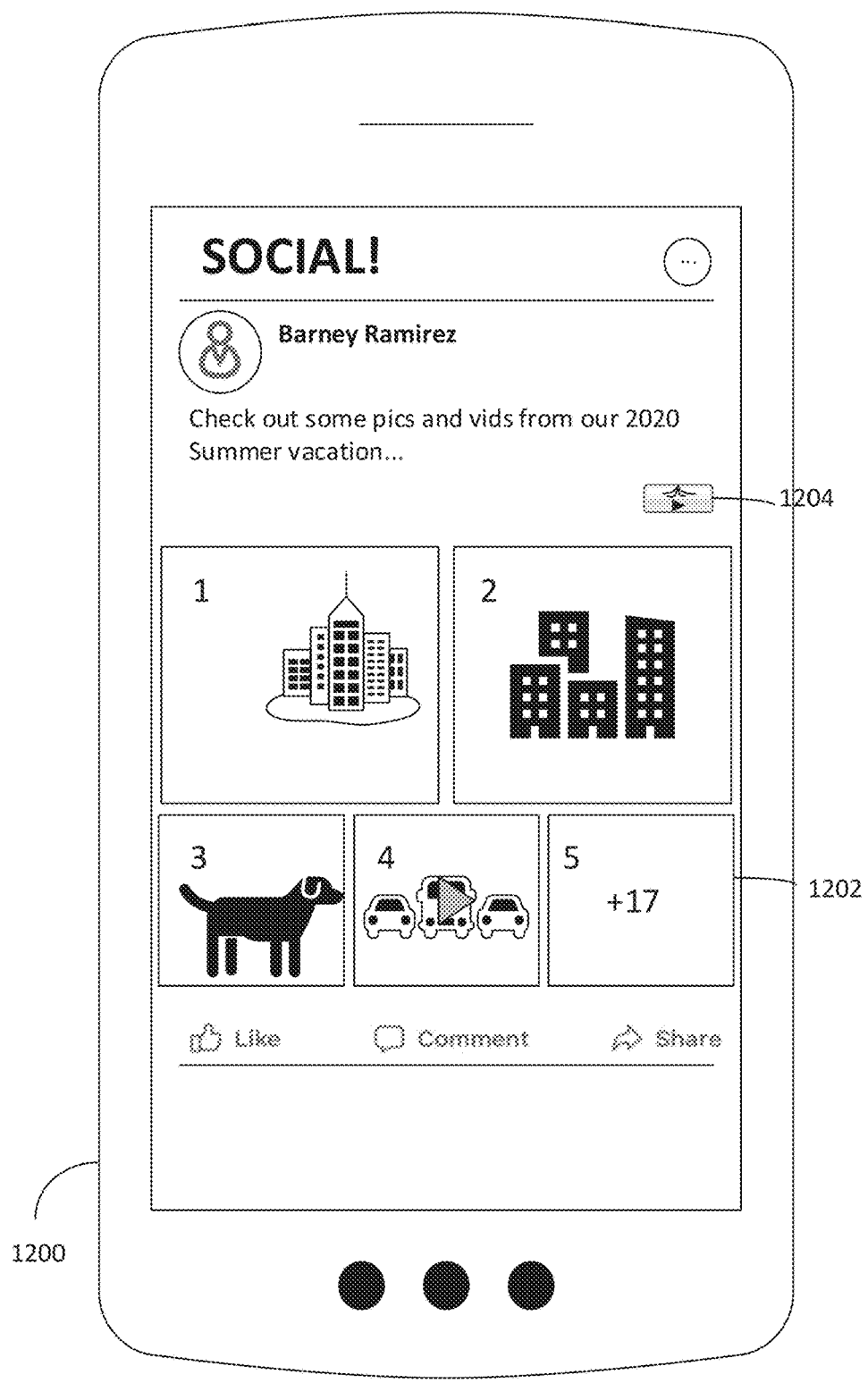
FIG. 12 is a user interface diagram showing an example of a user interface for a content posting in a content feed of a mobile, social networking application with which a content carousel may be integrated, consistent with embodiments of the present invention.

FIG. 12 is a user interface diagram showing an example of a user interface, on a mobile device 1200, for a content posting via a feed of a mobile, social networking application with which a content carousel may be integrated, consistent with embodiments of the present invention. As illustrated in FIG. 12, a member of the social networking service has posted a content item relating to a vacation taken by the member. The content post includes twenty-one photos and/or videos, five of which are shown as being selectable for viewing in the user interface, and seventeen of which are not, as indicated by the text, "+17." For instance, with a conventional user interface, to view any one of the additional seventeen photos represented in the user interface by the photo 1202 with the "+17" label, the end-user would first need to select the photo with reference 1202. With a conventional user interface, the end-user might select one photo, and in response, be presented with that one photo, or, with a scrollable interface of all photos. Accordingly, to see all photos and videos from the content post with a conventional user interface, the end-user would have to make a variety of selections and/or interact with the user interface to continuously scroll the user interface to view all of the photos and videos.

As illustrated in the example user interface of FIG. 12, a content carousel button 1204 allows the end-user to invoke a content carousel to view all twenty-one photos and videos, without any additional interaction with the user interface. For example, by pressing the button 1204, the end-user will be presented with a content carousel that automatically shows all of the photos and videos from the content post, without requiring any additional end-user input. The presentation of the photos and videos will generally be consistent with any end-user configuration settings that the end-user has established. Specifically, the end-user may configure a content item interval that determines the duration of time that each content item is shown before switching to the next content item. Of course, with videos, the content item interval may be equivalent to the play back duration. With some embodiments, the content items may be presented, via the content carousel, in the same order as posted and presented via the user interface as shown in FIG. 12.

Figure 13:
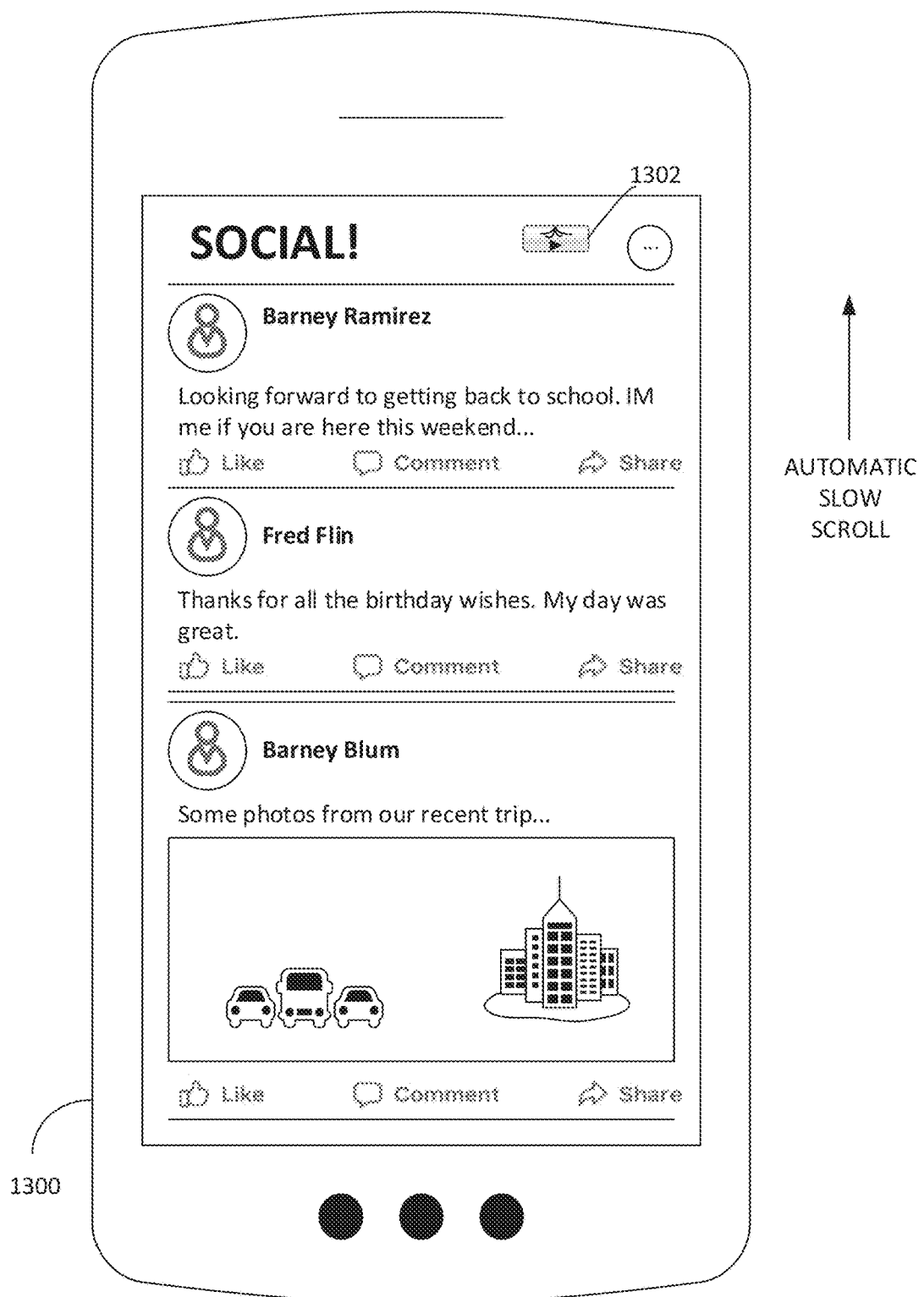
FIG. 13 is a user interface diagram showing an example of a user interface for a content feed of a mobile, social networking application with which a content carousel may be integrated, consistent with embodiments of the present invention.

FIG. 13 is a user interface diagram showing an example of a user interface for a feed of a mobile, social networking application with which a content carousel may be integrated, consistent with embodiments of the present invention. In this example, the mobile computing device 1300 is showing a user interface for a content feed of a social networking application that includes a content carousel button 1302. With a conventional user interface, in order to see any content post subsequent to the last content post shown in the user interface, the end-user would have to continuously and seemingly endlessly interact with the user interface to cause the user interface to directionally scroll to show new content. For example, with conventional user interfaces, an end-user makes a swiping gesture via the touch-screen display in order to make the user interface scroll to present new content posts. The swiping motion that an end-user makes when interacting with the user interface via the touch-screen display will tend to determine the speed and direction at which the user interface scrolls. Therefore, to slowly scroll in a direction to view new content using a conventional user interface, the end-user must continuously make swiping gestures via the touch-screen display, and make those gestures at just the right speed to ensure a smooth scrolling experience.

Consistent with embodiments of the present invention, a content carousel button 1302 is presented. When the end-user selects this button, the content carousel is invoked and the user interface will begin an automatic and continuous scroll, such that any content items in the feed not currently presented on the user interface will reveal themselves as the user interface scrolls in a direction from bottom to top. Consistent with some embodiments, the speed and direction of the scroll may be configured by the end-user via one or more end-user configuration settings. Accordingly, by invoking the content carousel via the button 1302, the end-user can view a large amount of content with only a single interaction with the user interface.

Figure 14:
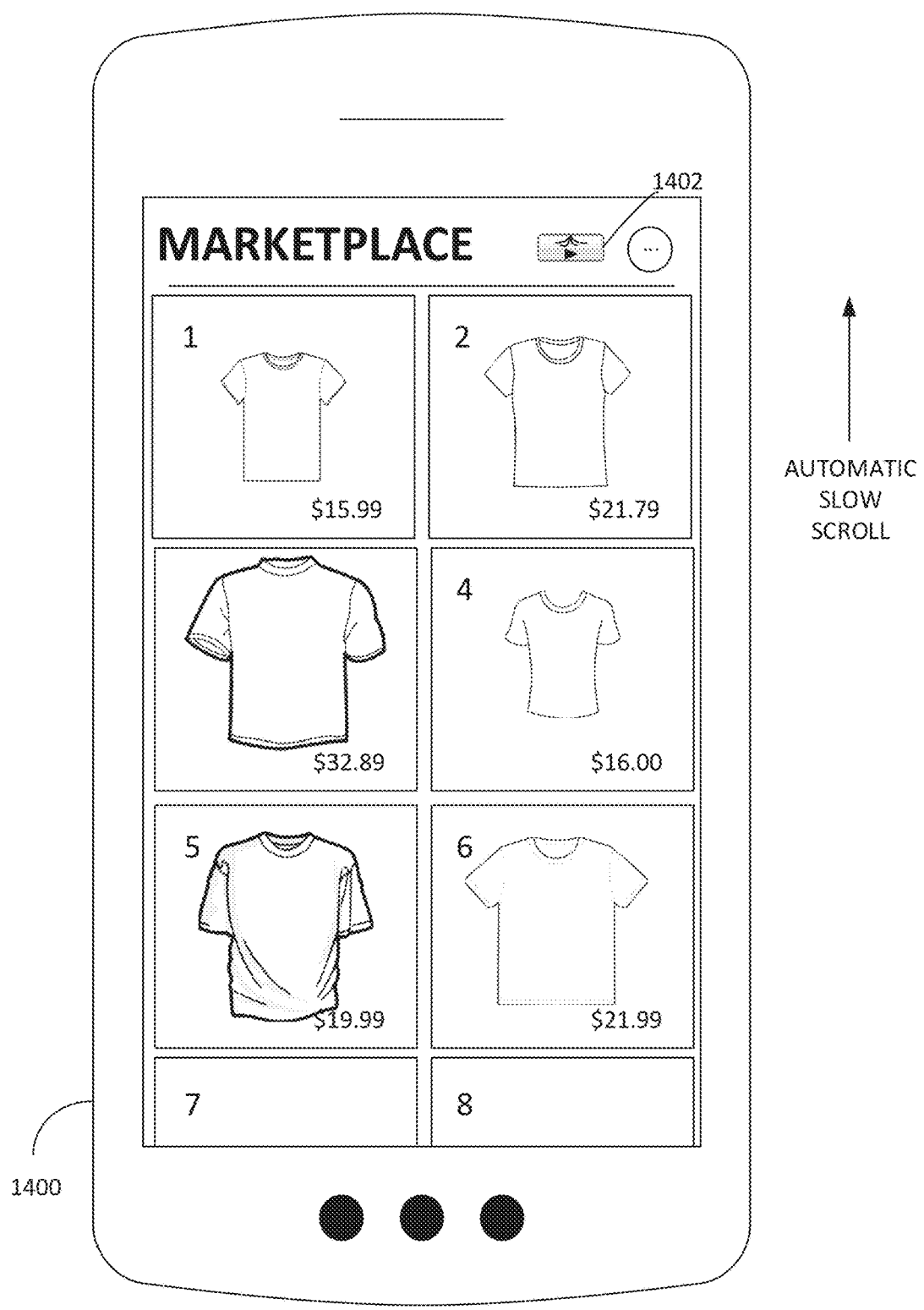
FIG. 14 is a user interface diagram showing an example of a user interface for a mobile e-commerce application having an integrated content carousel consistent with embodiments of the present invention.

FIG. 14 is a user interface diagram showing an example of a user interface for a mobile e-commerce application having an integrated content carousel consistent with embodiments of the present invention. Similar to what is shown and described in FIG. 13, but in the context of an e-commerce application, the example user interface shown in FIG. 13 includes a content carousel button 1402. Consistent with this embodiment, the content carousel may be integrated with an e-commerce application that displays a set of product listings via the user interface. These product listings may be categorically organized and presented in various separate user interfaces, such that they are browsable by the end-user. Alternatively, the user interface may show a group of product listings that result from an end-user performing a search for product listings. In any case, as shown in the example user interface in FIG. 14, when a group of product listings are presented together in a single, scrollable user interface, the content carousel button 1402 enables the end-user to invoke a content carousel to have the entire user interface continuously scroll in one direction at a constant speed. Again, the content carousel may be configurable by the end-user to control the speed at which the continuous scroll occurs.

Figure 15:
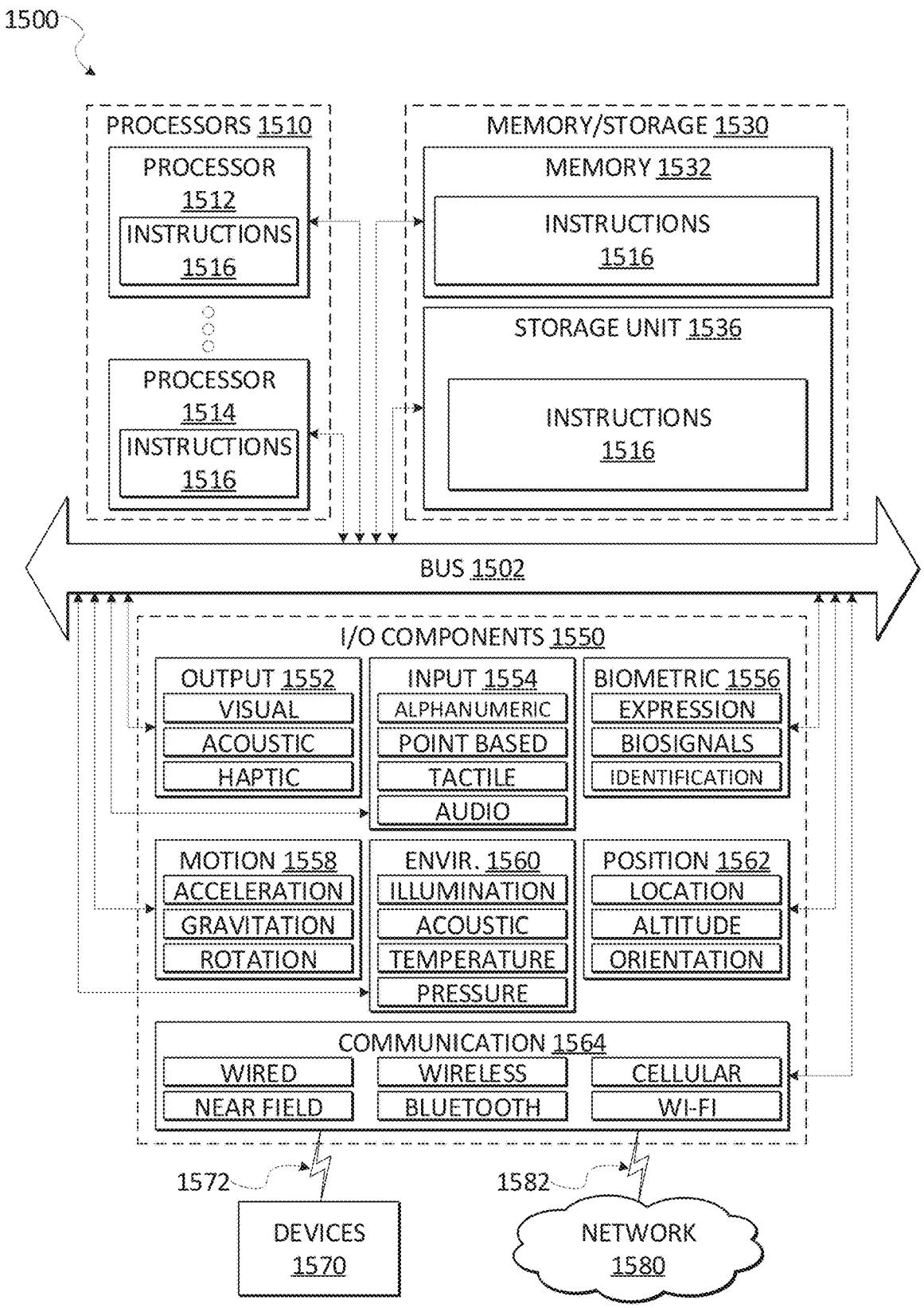
FIG. 15 is a system diagram illustrating an example of a computing device with which, embodiments of the present invention might be implemented.

FIG. 15 illustrates a diagrammatic representation of a machine 1500 in the form of a computer system within which a set of instructions may be executed for causing the machine to perform any one or more of the methodologies discussed herein, according to an example embodiment. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. For example the instructions 1516 may cause the machine 1500 to execute any one of the methods described in connection with presenting any one of the many user interfaces described and illustrated herein. Additionally, or alternatively, the instructions 1216 may implement the systems described in connection with FIG. 1, and so forth. The instructions 1516 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 may include processors 1510, memory 1530, and I/O components 1550, which may be configured to communicate with each other such as via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1512 and a processor 1514 that may execute the instructions 1516. The term "processor" is intended to include multi-core processors that may comprise two or more independent processors (sometimes referred to as "cores") that may execute instructions contemporaneously. Although FIG. 15 shows multiple processors 1510, the machine 1500 may include a single processor with a single core, a single processor with multiple cores (e.g., a multi-core processor), multiple processors with a single core, multiple processors with multiples cores, or any combination thereof.

The memory 1530 may include a main memory 1532, a static memory, and a storage unit 1536, all accessible to the processors 1510 such as via the bus 1502. The main memory 1530, the static memory 1534, and storage unit 1536 store the instructions 1516 embodying any one or more of the methodologies or functions described herein. The instructions 1516 may also reside, completely or partially, within the main memory 1532, within the static memory 1534, within the storage unit 1536, within at least one of the processors 1510 (e.g., within the processor's cache memory), or any suitable combination thereof, during execution thereof by the machine 1500.

The I/O components 1550 may include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environmental components 1560, or position components 1562, among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1558 may include acceleration sensor components (e.g., accelerometer), gravitation sensor components, rotation sensor components (e.g., gyroscope), and so forth. The environmental components 1560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via a coupling 1282 and a coupling 1572, respectively. For example, the communication components 1564 may include a network interface component or another suitable device to interface with the network 1580. In further examples, the communication components 1564 may include wired communication components, wireless communication components, cellular communication components, Near Field Communication (NFC) components, Bluetooth® components (e.g., Bluetooth® Low Energy). Wi-Fi® components, and other communication components to provide communication via other modalities. The devices 1570 may be another machine or any of a wide variety of peripheral devices (e.g., a peripheral device coupled via a USB).

Moreover, the communication components 1564 may detect identifiers or include components operable to detect identifiers. For example, the communication components 1564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1564, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1530, 1532, 1534, and/or memory of the processor(s) 1510) and/or storage unit 1536 may store one or more sets of instructions and data structures (e.g., software) embodying or utilized by any one or more of the methodologies or functions described herein. These instructions (e.g., the instructions 1516), when executed by processor(s) 1510, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices. e.g., erasable programmable read-only memory (EPROM), electrically erasable programmable read-only memory (EEPROM), FPGA, and flash memory devices, magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1580 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1516 may be transmitted or received over the network 1580 using a transmission medium via a network interface device (e.g., a network interface component included in the communication components 1564) and utilizing any one of a number of well-known transfer protocols (e.g., HTTP). Similarly, the instructions 1516 may be transmitted or received using a transmission medium via the coupling 1572 (e.g., a peer-to-peer coupling) to the devices 1570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1516 for execution by the machine 1500, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A computer-implemented method comprising:
   presenting via a user interface of an online application i) a product listing for a product that is available in a plurality of variants, ii) one or more input control elements enabling an end-user to select a particular variant of the plurality of variants, and iii) a plurality of end-user selectable thumbnail images, each thumbnail image corresponding with a content item comprising a graphic image, a photo or a video depicting a variant of the product;
   presenting via the user interface an end-user selectable button, which, when selected by the end-user, will invoke a content carousel to present via the user interface a set of the content items corresponding with the thumbnail images in accordance with i) configuration settings for the content carousel that have been defined by the end-user at an account level by accessing a user interface of the online application, and ii) input control elements selected by the end-user;
   responsive to detecting selection of the button, selecting for presentation via the content carousel a set of content items corresponding with the thumbnail images that i) satisfy one or more conditions established via the configuration settings for the content carousel that have been defined by the end-user, and ii) correspond with input control elements selected by the end-user; and
   presenting via the content carousel the selected content items, one content item at a time, wherein each photo presented via the content carousel is displayed for a length of time consistent with a content interval setting defined in the configuration settings for the content carousel.

2. The computer-implemented method of claim 1, wherein a particular configuration setting of the configuration settings establishes a maximum number of content items to be presented via the content carousel, wherein presenting via the content carousel the selected content items includes presenting no more than the maximum number of content items.

3. The computer-implemented method of claim 1, wherein a particular configuration setting of the configuration settings establishes a direction in which a transition is to occur when a presented content item is replaced in the content carousel by a next content item.

4. The computer-implemented method of claim 1, wherein a particular configuration setting of the configuration settings establishes a maximum video length of a video to be selected for presentation via the content carousel, such that any video with a playback time exceeding a playback time specified via the configuration setting will be excluded from being selected for presentation via the content carousel.

5. The computer-implemented method of claim 1, wherein a particular configuration setting of the configuration settings establishes a playback speed for video when video is presented via the content carousel.

6. A system comprising:
one or more processors configured to execute instructions;
one or more machine-storage media, storing instructions, which, when executed by the one or more processors, cause the system to:
present via a user interface of an online application i) a product listing for a product that is available in a plurality of variants, ii) one or more input control elements enabling an end-user to select a particular variant of the plurality of variants, and iii) a plurality of end-user selectable thumbnail images, each thumbnail image corresponding with a content item comprising a graphic image, a photo or a video depicting a variant of the product;
present via the user interface an end-user selectable button, which, when selected by the end-user, will invoke a content carousel to present via the user interface a set of the content items corresponding with the thumbnail images in accordance with i) configuration settings for the content carousel that have been defined by the end-user at an account level by accessing a user interface of the online application, and ii) input control elements selected by the end-user;
responsive to detecting selection of the button, select for presentation via the content carousel a set of content items corresponding with the thumbnail images that i) satisfy one or more conditions established via the configuration settings for the content carousel that have been defined by the end-user, and ii) correspond with input control elements selected by the end-user; and
present via the content carousel the selected content items, one content item at a time, wherein each photo presented via the content carousel is displayed for a length of time consistent with a content interval setting defined in the configuration settings for the content carousel.

7. The system of claim 6, wherein a particular configuration setting of the configuration settings establishes a maximum number of content items to be presented via the content carousel, wherein presenting via the content carousel the selected content items includes presenting no more than the maximum number of content items.

8. The system of claim 6, wherein a particular configuration setting of the configuration settings establishes a direction in which a transition is to occur when a presented content item is replaced in the content carousel by a next content item.

9. The system of claim 6, wherein a particular configuration setting of the configuration settings establishes a maximum video length of a video to be selected for presentation via the content carousel, such that any video with a playback time exceeding a playback time specified via the configuration setting will be excluded from being selected for presentation via the content carousel.

10. The system of claim 6, wherein a particular configuration setting of the configuration settings establishes a playback speed for video when video is presented via the content carousel.

* * * * *